United States Patent [19]
Streng

[11] Patent Number: 5,167,879
[45] Date of Patent: Dec. 1, 1992

[54] OPEN-SURFACE COMPONENT

[75] Inventor: Andreas Streng, Ratingen, Fed. Rep. of Germany

[73] Assignee: Balcke-Dürr Aktiengesellschaft, Ratingen, Fed. Rep. of Germany

[21] Appl. No.: 853,897

[22] Filed: Mar. 19, 1992

Related U.S. Application Data

[63] Continuation of Ser. No. 715,875, Jun. 14, 1991, abandoned, which is a continuation of Ser. No. 505,674, Apr. 6, 1990, abandoned.

Foreign Application Priority Data

Apr. 7, 1989 [DE] Fed. Rep. of Germany ... 8904345[U]

[51] Int. Cl.⁵ .............................. B01F 3/04; B01F 5/00
[52] U.S. Cl. ................................. 261/112.2
[58] Field of Search ..................... 261/112.2

[56] References Cited

U.S. PATENT DOCUMENTS

| | | | |
|---|---|---|---|
| 3,374,992 | 3/1968 | Greer | 261/112.2 |
| 3,415,502 | 12/1968 | Munters | 261/112.2 |
| 3,540,702 | 11/1970 | Uyama | 261/112.2 |
| 3,963,810 | 6/1976 | Holmberg et al. | 261/112.2 |
| 4,186,159 | 1/1980 | Huber | 261/112.2 |
| 4,670,197 | 6/1987 | Stackhouse | 261/112.2 |
| 4,801,410 | 1/1989 | Kinney, Jr. et al. | 261/112.2 |

FOREIGN PATENT DOCUMENTS

| | | |
|---|---|---|
| 0361225 | 4/1990 | European Pat. Off. . |
| 678100 | 7/1939 | Fed. Rep. of Germany ... 261/112.2 |
| 2045082 | 3/1973 | Fed. Rep. of Germany ... 261/112.2 |
| 768442 | 4/1979 | U.S.S.R. . |
| 772572 | 4/1979 | U.S.S.R. . |
| 1149479 | 5/1983 | U.S.S.R. . |

Primary Examiner—Tim Miles
Attorney, Agent, or Firm—Robert W. Becker & Associates

[57] ABSTRACT

The invention relates to an open-surface component for transferring heat and/or material between a gas and a liquid that are conveyed in crosscurrent and/or countercurrent flows, comprising a plurality of panels (1) that are disposed next to one another and are provided with shaped portions (2) in the form of channels or channel portions for guiding the aforementioned fluid flows through, with the channel or channel portions enabling a spreading out, transverse to the directions of the main flows, of the respective fluid flows between two adjacent panels (1). In order at relatively low pressure drops to enable a high transfer capacity of the open-surface component, the panels (1) that are provided with channel-like shaped portions (2) are additionally provided with a shaping transverse to the two main dimensional directions of the panels (1), and in particular preferably via a semicircular, sinusoidal, or serpentine wavy configuration.

6 Claims, 2 Drawing Sheets

OPEN-SURFACE COMPONENT

This is a continuation of application Ser. No. 07/715,875, filed Jun. 14, 1991, now abandoned, which was a continuation of application Ser. No. 505,674, filed Apr. 6, 1990, now abandoned.

The invention relates to an open-surface component for transferring heat and/or material between a gas and a liquid that are conveyed in crosscurrent and/or countercurrent flows, the component comprising a plurality of panels that are disposed next to one another and are provided with shaped portions in the form of channels or channel portions for guiding said fluid flows through, with the channel or channel portions enabling a spreading out, transverse to the directions of the main flows, of the respective fluid flows between two adjacent panels.

Such open-surface components for transferring heat and/or material between a gas and a liquid that are conveyed in crosscurrent and/or countercurrent flows are known in particular for cooling towers. In this connection, the liquid is applied as uniformly as possible via suitable distribution elements on the open-surface components, which are composed of a plurality of panels that are disposed next to one another; a film forms on the surface of the individual panels and flows along the channels or channel portions. The design of these channels or channel portions enables a spreading-out, transverse to the directions of the main flows, of the respective fluid flows between two adjacent panels, so that an evening out of the liquid applied to the surface of the panels results in the horizontal direction, and in particular independent of whether the gas is guided through a side inlet into the components in crosscurrent flow to the liquid, or is guided through an inlet at the bottom in countercurrent flow to the liquid. In both cases, a coupled heat and material transfer takes place between the two fluids. As process goals, the liquid and/or the gas can be cooled, pollutant gases can be absorbed in the liquid, or the gas can be moistened.

The open-surface components, which form a film, comprise a plurality of shaped panels or thin plastic sheets that are adhered or connected together and are provided with shaped portions to form channels or channel portions. Where the flow channels extend all the way through, they extend at an angle to the vertical. During assembly, the individual panels are alternately turned by 180°, so that zig-zagged channels result. Thus, a more uniform distribution of the fluids that are brought into contact is achieved over the cross-sectional area of flow, and a longer flow path is achieved. Additional fine profilings, for example shaped portions of an order of magnitude of the thickness of the film, lead to a further intensification of the heat and/or material transfer.

To improve this long-known state of development, in European patent application no. 115 455, instead of a linear, yet inclined channel course, a sinusoidal or serpentine channel-like shaped portion configuration is described in order with relatively low pressure loss to achieve transfer capacities at the same or even a higher level.

To further intensify the process where wavy panels are used, European patent application no. 56 911 proposes providing these panels with suitable fine profilings. An additional measure in this direction is disclosed in European patent application no. 117 076, where vertical guide elements are disposed on wavy panels.

European patent application no. 70 676 discloses panel deformations that result from the superimposition of two or more sinusoidal undulations, thus for the first time providing a three-dimensional flow guidance.

The criss-crossing, sinusoidal channel guides disclosed in European patent application no. 115 455 are superior to zig-zagged channels from a flow standpoint; however, the advantages are only partially realized due to the extensive geometric similarity of the constructions. Simple wavy designs, even with the fine profilings of European patent application no. 56 911, cannot achieve the required high output values due to the relatively small volume-specific transfer surface. Although these values are improved by the vertical guide elements of European patent application no. 117 076, with this construction a transverse distribution of the fluids conveyed to the open-surface components is prevented, which has a negative impact, especially where the supply to the open-surface components is nonuniform. Although these drawbacks can be partially eliminated by multiply undulated panels pursuant to European patent application no. 70 676, these constructions, due to the undulations, lead to non-oriented or nondirectional flow configurations, so that the fluid flows are no longer guided in fixed paths, as was the case with the criss-cross channels. The result is a worsening of the transverse distribution. In addition, due to the superimposed undulations, a plurality of intermediate spaces that taper into one another at an acute angle and have reduced fluid flow densities result where adjacent panels contact one another, so that despite the high volume-specific transfer surfaces, the desired high transfer capacities are not achieved. Furthermore, the channel walls that taper toward one another at an acute angle at the contact points are susceptible to an increased fouling due to deposits, which during the course of operation is associated with an increasing drop in output.

It is an object of the present invention to eliminate the aforementioned drawbacks of open-surface components of the aforementioned type, and to provide an open-surface component that with regard to a given cross-sectional area, pressure loss or drop, and material charge, achieves a considerably higher heat and material transfer capacity while at the same time being less susceptible to fouling.

SUMMARY OF THE INVENTION

To realize this object, the present invention is characterized primarily in that the panels, which are provided with shaped portions (first corrugations), are additionally provided with a shaping (second corrugations) transverse to the two main dimensional directions of the panels.

Whereas with the heretofore known constructions the central lines of the channels or channel portions formed by shaped portions in the panels extend in a single plane, with the present invention there results a three-dimensional path of the center lines of tho channels, consequently resulting in considerable improvements from a flow standpoint and an increase of the surface that is available for the heat and/or material exchange. After the shaped and wavy panels have been adhered or connected together, the inventive open-surface component has a high inherent stability and resistance to compression. The three-dimensional channels or channel portions that result from the adhesion or connection lead due to their advantageous flow design to relatively low pressure drops and high transfer capacities. Since adjacent channel-like shaped portions criss-cross in a known manner, yet have a longer flow path due to the additional spatial guidance, the present invention achieves an improved transverse distribution or transverse mixing of the fluid streams that are in contact, thus resulting in a further improvement of the ratio of transfer capacity to pressure loss. The inventive open-surface components are less susceptible to fouling than are heretofore known constructions. The inventive, three-dimensionally shaped panels are preferably made of plastic and can be produced in a known manner in a vacuum deep-drawing or cupping process, so that fine profilings (third corrugations) can also be obtained in a straightforward manner.

Pursuant to a further feature of the invention, the panels have a semicircular, sinusoidal, or serpentine wavy configuration. As a result of this undulation and due to the continuous path of the channel, a good flow condition for the open-surface component results.

Pursuant to a preferred further development of the inventive open-surface component, the panels are additionally provided on their surface with a fine profiling.

An advantageous further development can also be achieved if the central axes of the undulation of the panels that are provided with passages or channels extend vertically between an inlet and outlet in conformity with the main direction of flow of the liquid.

It is furthermore proposed pursuant to the invention that the wavy panels be provided with channel-like shaped portions to guide the fluid flows through that essentially extend in a sinusoidal serpentine manner between the liquid inlet and outlet. Furthermore, the wavy panels can be provided with channel-like shaped portions to guide the aforementioned fluid flows through that extend at an angle and essentially linearly relative to the vertical main direction of flow of the liquid.

It is finally proposed pursuant to the invention that the channel-like shaped portions at the inlet and outlet of the fluid flows preferably have an angle of 30° relative to the vertical main direction of flow of the liquid.

BRIEF DESCRIPTION OF THE DRAWING

One exemplary embodiment of an inventive open-surface component is illustrated in the drawings, in which.

DESCRIPTION OF PREFERRED EMBODIMENTS

Figure 1:
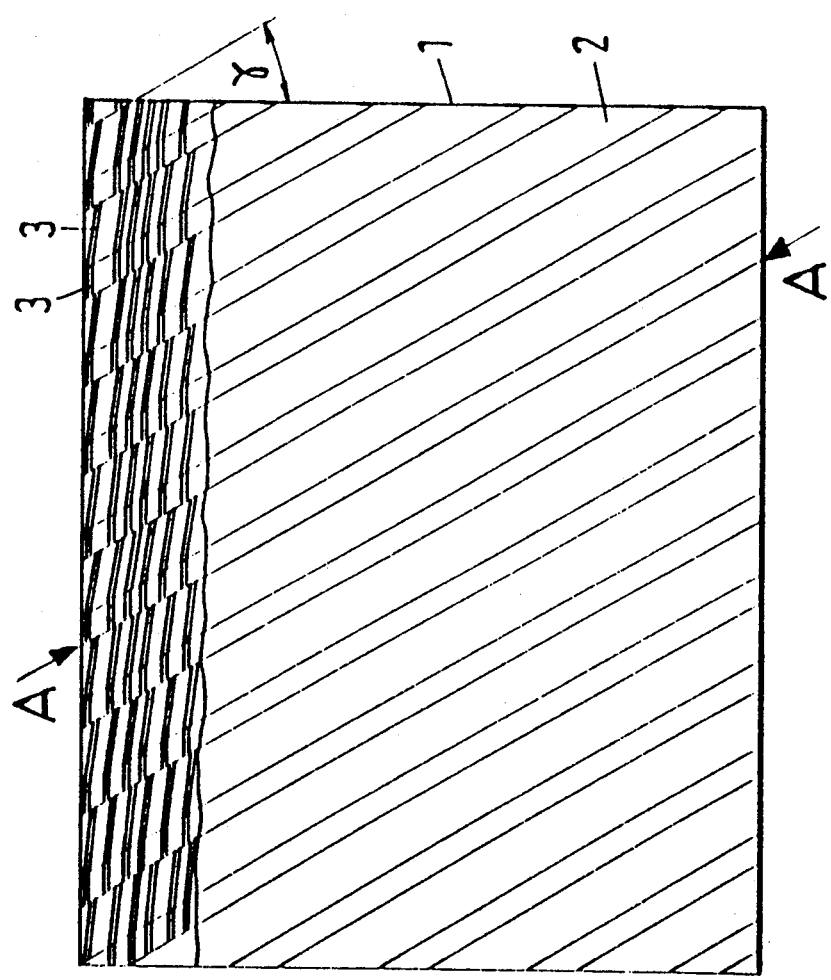
FIG. 1 A side view of an open-surface component that is comprised of a plurality of panels, FIG. 2 An angled cross-sectional view taken along the line A—A of the panel of the open-surface component illustrated in FIG. 1, FIG. 3 A cross-sectional view through this panel taken along line B—B in FIG. 2, and FIG. 4 A perspective view of the open-surface component illustrated in FIG. 1, whereby for the sake of simplification only three adjacent panels are shown.

The open-surface component, which is intended for use in cooling towers, pollutant absorbers, or air-conditioning units, is composed of a number of shaped panels 1, with the outermost panel 1 being illustrated in elevation. From the drawing it can be seen that channel-like shaped portions are provided that have a trapezoidal cross-sectional configuration and that in the illustrated embodiment extend at an angle $\gamma$ of 30° relative to the vertical. Indicated in the upper region of FIGS. 1 and 2 is a fine profiling 3 that leads to an improved moistening of the surface and to an increase in the degree of turbulence.

Figure 2:
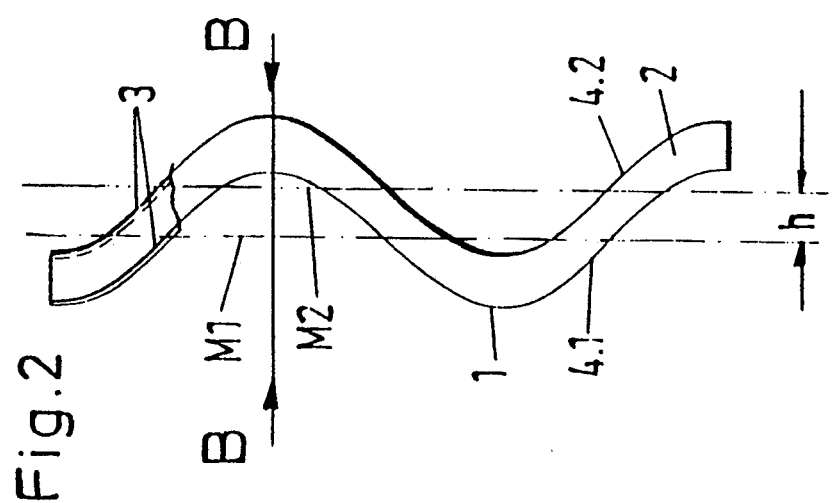

FIG. 2 shows that the panels 1 that are used to form the open-surface component are additionally shaped transverse to the two main dimensions of the panel 1; in particular, in the illustrated embodiment the panels are shaped by a sinusoidal wave. In a manner that is advantageous to flow, this wave is formed from two parallel sine functions that are offset by the height "h" of the trapezoid, with these sine functions corresponding, in the side view, to the narrow delimiting walls 4.1 and 4.2 of the channel-like shaped portions 2.

Figure 3:
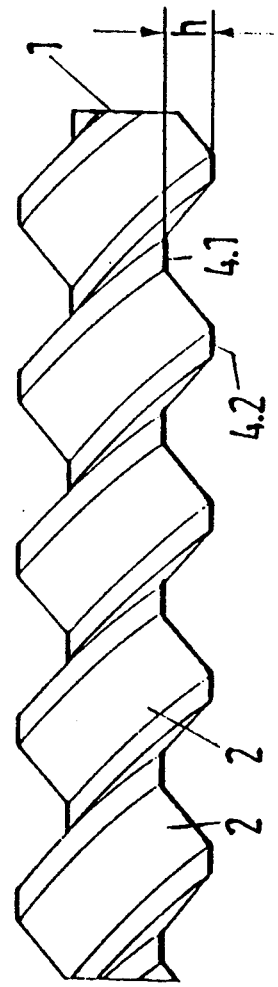

FIG. 3 clearly shows the shaping of the panel 1 in an elevational view, whereby in order to facilitate illustration, the fine profiling 3 is not indicated. As can be seen, the channel-like shaped portions 2 extend not only at an angle toward the side, but rather in addition have a depth in conformity with the selected wave geometry.

Figure 4:
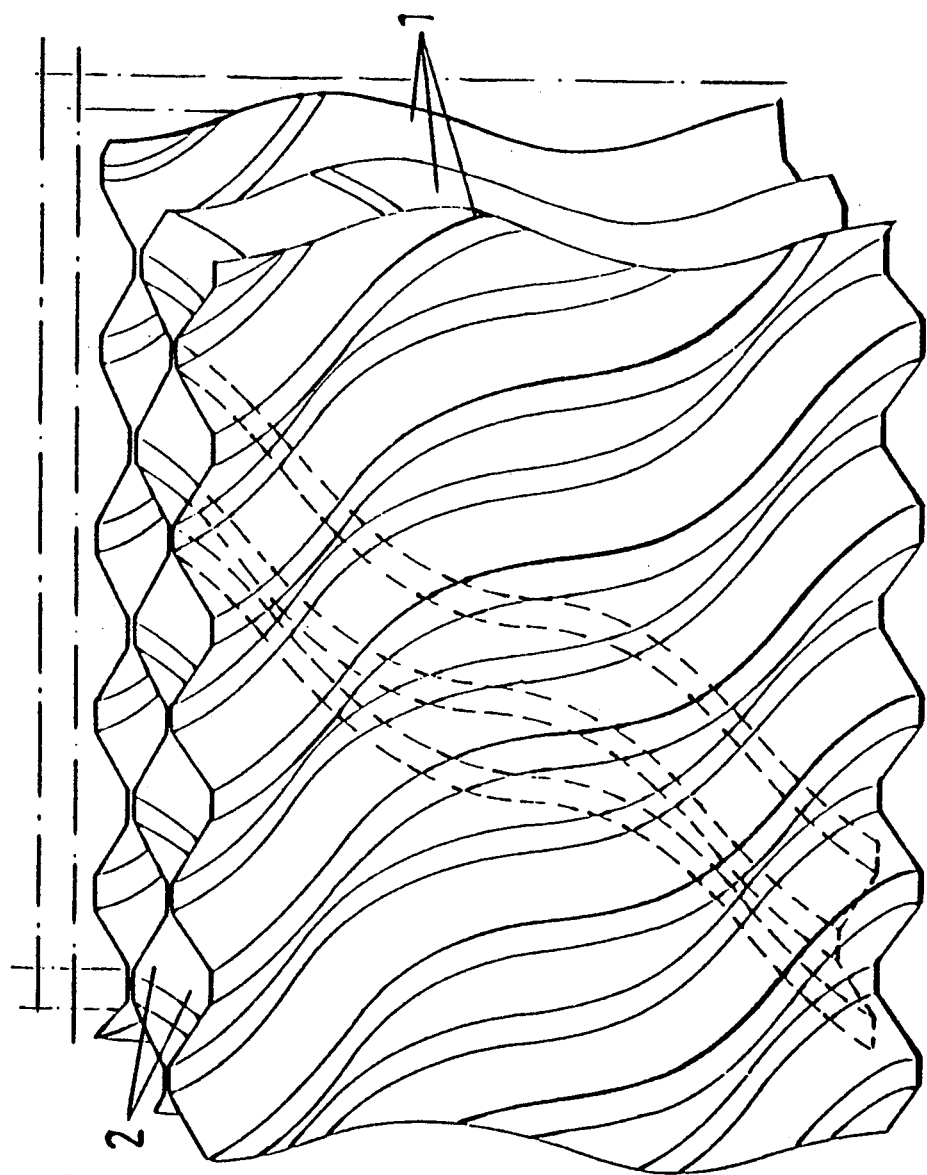

The illustrated panels 1 are produced in a manner that is advantageous to production from thin plastic sheets in a vacuum deep-drawing or cupping process. To assemble the open-surface component, each second panel 1 is rotated about the vertical central axes M1 and M2 (see FIG. 2) by 180°, and is adhered to the preceding panel 1 in a known manner or is connected therewith via formed members. This results in criss-crossing channel-like shaped portions 2 having a trapezoidal cross-sectional configuration between adjacent panels 1 as clearly shown in the perspective illustration of FIG. 4. The dashed lines show a wavy or helical channel pattern of the second panel 1. As a consequence of the cooperation of the channel-like shaped portions 2 of adjacent panels 1, a spatially serpentine or meandering direction of flow in given, fixed paths or channels is imparted to the fluid flows.

Instead of the linear channel-like shaped portions 2 that extend at an angle and are illustrated in FIG. 1, channel-like shaped portions that extend in a sinusoidal or serpentine manner can also be provided in an advantageous manner that then are additionally superimposed by the sinusoidal and serpentine undulations of the panels 1.

A further advantageous embodiment features linear, vertical channel-like shaped portions that have a relatively short path length and that to deliver an improved transverse distribution of the fluids, are transversely offset in sections and are provided with an additional sinusoidal undulation.

The present invention is, of course, in no way restricted to the specific disclosure of the specification and drawings, but also encompasses any modifications within the scope of the appended claims.

I claim:

1. An open-surface component for transferring heat and/or material between a gas and a liquid that are conveyed in crosscurrent and/or countercurrent fluid flow, said component comprising:
   a plurality of panels that are each disposed in an essentially vertical plane next to one another;
   each panel being provided with parallel channels in the form of first corrugations for guiding said fluid flows through, said channels extending at an angle relative to a vertical direction; and
   each panel being further provided with second corrugations extending transverse to said vertical plane and having a greater amplitude than said first corrugations, said second corrugations effecting an undulation of said first corrugations in said vertical direction.

2. An open-surface component according to claim 1, wherein said panels further comprise third corrugations in the form of fine-profilings.

3. An open-surface component according to claim 1, wherein said angle is an acute angle.

4. An open-surface component according to claim 3, wherein said angle is 30°.

5. An open-surface component according to claim 1, wherein said channels extend essentially in said vertical direction.

6. An open-surface component according to claim 1, wherein said second corrugations extend essentially horizontally.

* * * * *